US006961419B2

(12) United States Patent
Power et al.

(10) Patent No.: US 6,961,419 B2
(45) Date of Patent: Nov. 1, 2005

(54) CONTACT CENTER DATA INTEGRATION WITH ENTERPRISE APPLICATIONS

(75) Inventors: Mark J. Power, Carol Stream, IL (US); Dave Mosquera, West Chicago, IL (US); Anthony J. Dezonno, Bloomingdale, IL (US); Jeffrey D. Hodson, Wheaton, IL (US); Joseph Bloom, Libertyville, IL (US); David Funck, Wheaton, IL (US); Eric James, Elgin, IL (US); Michael Peters, Downers Grove, IL (US); Craig R. Shambaugh, Wheaton, IL (US); Nayel Saleh, Round Lake, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 365 days.

(21) Appl. No.: 10/114,487

(22) Filed: Apr. 2, 2002

(65) Prior Publication Data

US 2003/0185381 A1    Oct. 2, 2003

(51) Int. Cl.[7] .............................................. H04M 3/00
(52) U.S. Cl. .............................................. 379/265.09
(58) Field of Search .................... 379/88.17, 88.18, 379/90.01, 93.01, 93.12, 212.01, 265.02, 379/265.09, 900

(56) References Cited

U.S. PATENT DOCUMENTS

| 5,473,680 | A | * | 12/1995 | Porter .................... 379/221.15 |
| 5,761,502 | A | * | 6/1998 | Jacobs .................... 707/103 R |
| 5,884,032 | A | * | 3/1999 | Bateman et al. ............ 709/204 |
| 5,937,051 | A | * | 8/1999 | Hurd et al. ............ 379/212.01 |
| 6,055,308 | A | | 4/2000 | Miloslavsky et al. |
| 6,100,891 | A | | 8/2000 | Thorne |
| 6,130,933 | A | * | 10/2000 | Miloslavsky ............. 379/90.01 |
| 6,178,239 | B1 | | 1/2001 | Kishinsky et al. |
| 6,205,412 | B1 | | 3/2001 | Barskiy et al. |
| 6,321,190 | B1 | * | 11/2001 | Bernardes et al. ............. 704/8 |
| 6,480,600 | B1 | * | 11/2002 | Neyman et al. ....... 379/265.09 |
| 6,493,447 | B1 | * | 12/2002 | Goss et al. ............ 379/265.09 |

FOREIGN PATENT DOCUMENTS

EP        0 806 858 A2    4/1977

OTHER PUBLICATIONS

Merriam Webster's Collegiate Dictionary, 10th Edition, p. 801.*

* cited by examiner

Primary Examiner—Bing Q. Bui
(74) Attorney, Agent, or Firm—Welsh & Katz, Ltd.

(57) ABSTRACT

A method and apparatus are provided for processing a call with a client detected by a call center to an agent of the call center. The method includes the step of providing a call object for the call, collecting attributes of the call within the call object, associating an agent object with the call object and displaying client data to an agent of the call center based upon a view process of the associated agent object.

28 Claims, 1 Drawing Sheet

CONTACT CENTER DATA INTEGRATION WITH ENTERPRISE APPLICATIONS

FIELD OF THE INVENTION

The field of the invention relates to communication systems and more particularly to call centers.

BACKGROUND OF THE INVENTION

Call-centers are generally known. A call-center is typically used wherever a large number of calls must be handled for some common enterprise. Typically, the calls of the enterprise are routed through the call-center as a means of processing the calls under a common format.

Call-centers typically include at least three elements: an automatic call distributor (ACD), a group of agents for handling the calls, and a host computer with a database containing customer information. The individual agents of the groups of agents are each typically provided with a telephone console and a computer terminal. The telephone terminal receives customer calls distributed to the agent by the ACD. The terminal may be used to retrieve customer records from the host.

Call-centers are typically automated in the delivery of calls to agents and in the retrieval of customer records for use by agents. Features within the PSTN such as dialed number identification service (DNIS) and automatic number identification (ANI) may be used to determine not only the destination of the call, but also the identity of the caller. DNIS and ANI information, in fact, may be delivered by the PSTN to the ACD in advance of call delivery.

Based upon the destination of the call and identity of the caller, the ACD may select the agent most qualified to service the call. By sending an identifier of the selected agent along with the identity of the caller to the host, the host may automatically retrieve and download customer records to the agent's terminal at the same instant as the call arrives.

While call-centers are effective, they are still complex and difficult to adapt to changing business environments. Accordingly, a need exists for a way of automatically adapting the call center to business conditions.

SUMMARY

A method and apparatus are provided for processing a call with a client detected by a call center to an agent of the call center. The method includes the step of providing a call object for the call, collecting attributes of the call within the call object, associating an agent object with the call object and displaying client data to an agent of the call center based upon a view process of the associated agent object.

DETAILED DESCRIPTION OF AN ILLUSTRATED EMBODIMENT

Figure 1:
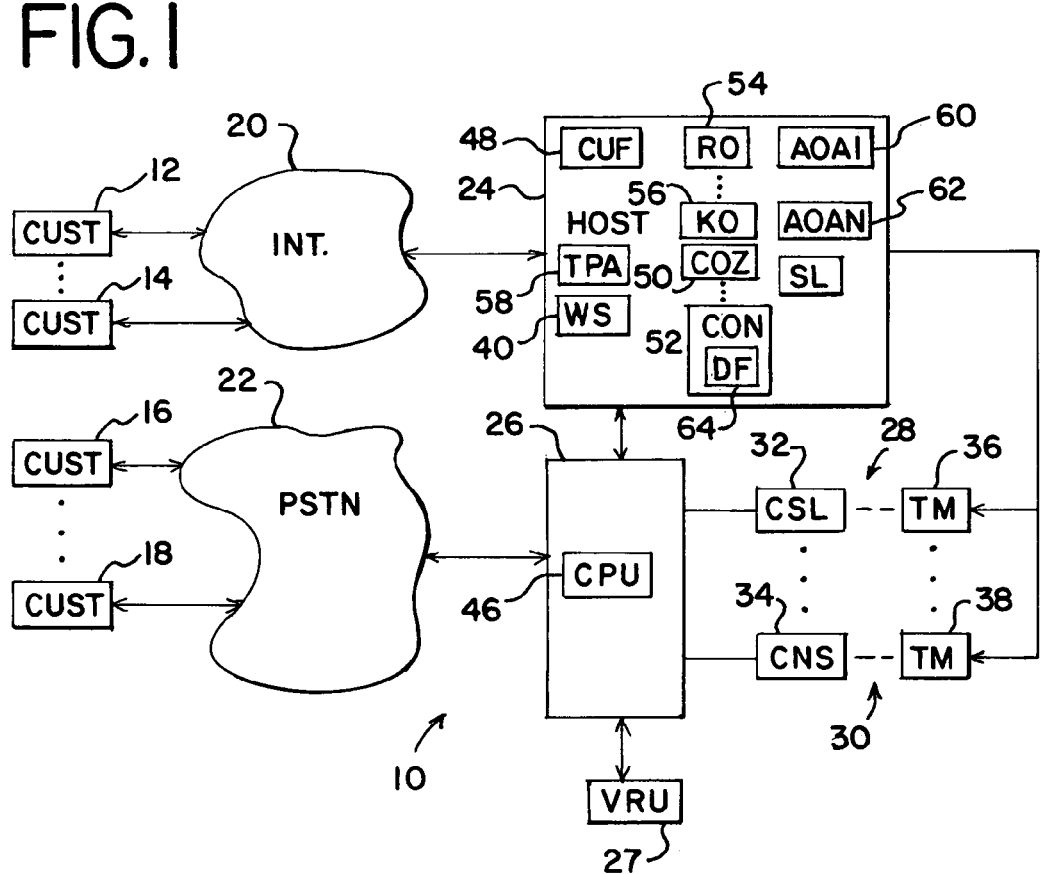
FIG. 1 is a block diagram of a call processing system in accordance with an illustrated embodiment of the invention.

FIG. 1 is a block diagram of a call processing system 10 shown generally in accordance with an illustrated embodiment of the invention. Under the illustrated embodiment, calls may be received from (or placed to) clients 12, 14, 16, 18 through the public switch telephone network (PSTN) 22 or through the Internet 20.

The call processing system 10 may be used by an organization (e.g., a merchant, a political organization, etc.) to setup call connections through the PSTN or Internet between an external client of the organization and a selected agent of the organization for purposes of advancing the agenda of the organization.

For example, where the organization is a merchant, the call processing system 10 may be structured around an automatic call distributor 26 and/or a website 40, that is provided to promote the wares of the merchant. The merchant may advertise its wares through television or newspaper ads. The ads may provide a telephone number associated with the ACD 26 or the Internet address (i.e., the URL) of the website 40 within a host 24. Alternatively, the organization may set up links to the website 40 from search engines or from the websites of other merchants selling related merchandise.

The call processing system 10 differs from other systems in a number of regards. For example, in order to allow the processing of calls through a number of different mediums (e.g., PSTN, Internet, e-mail, etc.), object-oriented programming may be used as a mechanism for tracking, moving and servicing calls. As shown in FIG. 1, the host 24 may maintain a number of call objects (also sometimes referred to herein as "COs") 50, 52 in reserve for use, as needed, for assignment to calls. As used herein a "call object" is an object oriented program containing data and programming regarding the processing of a particular call type.

The call objects 50, 52 may be used to collect attributes about a call. A routing object (also sometimes referred to herein as an "RO") 54, 56 may be used in conjunction with the CO 50, 52 to set up a call with a selected agent 28, 30 based upon the attributes of the call object and the business rules of the organization. A view process provided by an agent object (also sometimes referred to herein as an "AO") 60, 62 of the selected agent may be used to present data through an agent terminal 36, 38 to the selected agent based upon information provided by the call object 50, 52.

As is known, an object-oriented program may include both programming code and data. Communication with an object-oriented program is achieved through a predetermined message format.

A separate object-oriented program (i.e., a call object) may be associated with each call. By associating a call object with each call, the call object may carry data about the call along with the call during the various processing steps and provides great scalability by allowing calls to be portable among applications and processing platforms. For example, by carrying data about the source or terminus of a call, a call object may allow control of the call channel from any connected platform.

Further, the call objects 50, 52 may be classified by use. For example, a first call object (e.g., 50) may be part of a class of call objects provided to calls through the PSTN 22. A second call object (e.g., 52) may be part of a class of call objects provided for calls through the Internet.

The portability of a call object allows it to be associated with any of a number of application objects (i.e., routing objects), on any platform, based upon the data carried within the call object. Routing objects may be used to incorporate the business rules and enterprise data of the organization using the call processing center 10 to route a call object to other object-oriented or procedural programming applications. The source of the arguments necessary to the RO 54, 56 for routing the call may be provided by the CO 50, 52.

Turning first to calls, in general, a brief description will be provided of the equipment and methods used in processing calls by the call processing center 10. Following the description of call processing, a description will be provided of how object-oriented programming may be used in the processing of those calls.

In the case of telephone calls through the PSTN 22, a customer may place (or receive) the call through a communication connection 16, 18 that may include a conventional telephone. Alternatively, the customer communication connection 16, 18 may include the use of a cellular telephone and cellular network. As a further alternative, the communication connection 16, 18 may include the use of a cellular telephone and cellular connection through a satellite communication system (e.g., Iridium).

In the case of calls received through the Internet, the call may be placed (or received) in the form of text messages or, alternatively, in the form of audio messages using Voice-over-IP (VoIP). In the case of a call through the Internet 20, the communication connection 12, 14 may be provided through a customer terminal.

Within the call processing system 10, a number of agent stations 28, 30 may be provided for call handling. Each agent station 28, 30 may be provided with a telephone console 32, 34 for handling conventional calls and a terminal 36, 38 for displaying customer data and for handling calls through the Internet 20.

To access the organization by telephone, a customer 16, 18 may dial the number associated with the ACD 26. The PSTN 22 may deliver the call to the ACD 26 along with certain call associated information (e.g., automatic number identifier (ANI), dialed number identification service (DNIS), etc.). Upon delivery of the call to the ACD 26, a CPU 46 within the ACD 26 may send a call arrival message to the host 24, including the call associated information and any other pertinent switch information (e.g., trunk identifier, port identifier of the switch 26, etc.).

The host 24, in turn, may assign an idle call object (CO) 50, 52 to the call. In addition to assigning a call object to the call, the host 24 may enter the call associated information and switch information into a data field 64 of the assigned call object as call attributes for purposes of tracking the call and for selecting an agent for handling the call (discussed in more detail below).

In the alternative, the host 24 may retrieve the telephone numbers of one or more customers 16, 18 from customer files (CUF) 48 for purposes of placing outgoing calls. The host 24 may transfer the numbers to the CPU 46. The CPU 46 may, in turn, transfer the telephone numbers to the PSTN 22 and monitor the connection for pick-up by the customer 16, 18. Upon pick-up by the customer 16, 18, an agent may be selected for connection to the call, as discussed below.

In conjunction with retrieval of the customer numbers, the host 24 may assign a CO 50, 52 to each outgoing call. The host 24 may also include an identifier of the customer and call campaign prompting the call in a data field of the assigned CO 50, 52.

To access the website 40, a customer may simply activate a browser on his terminal 16, 18 and enter the URL of the website 40. Upon activating an ENTER button, the browser within the customer's terminal 16, 18 may compose an access request and forward the access request to the host 24. Upon receiving the information request, the host 24 may decode the access request and recover the URL of the website 40 and a URL of the customer 16, 18.

Upon decoding and recognizing from the URL that the access request is intended for the website 40, the host 24 may forward the access request to the application providing the functionality of the website 40. In addition to routing access and information requests, the host 24 may also function to track website usage.

To this end, the host 24 may select a call object 50, 52 for assignment to the call. The host 24 may enter at least the URL of the customer 16, 18 into the call object 50, 52 as an attribute of the call.

Figure 2:
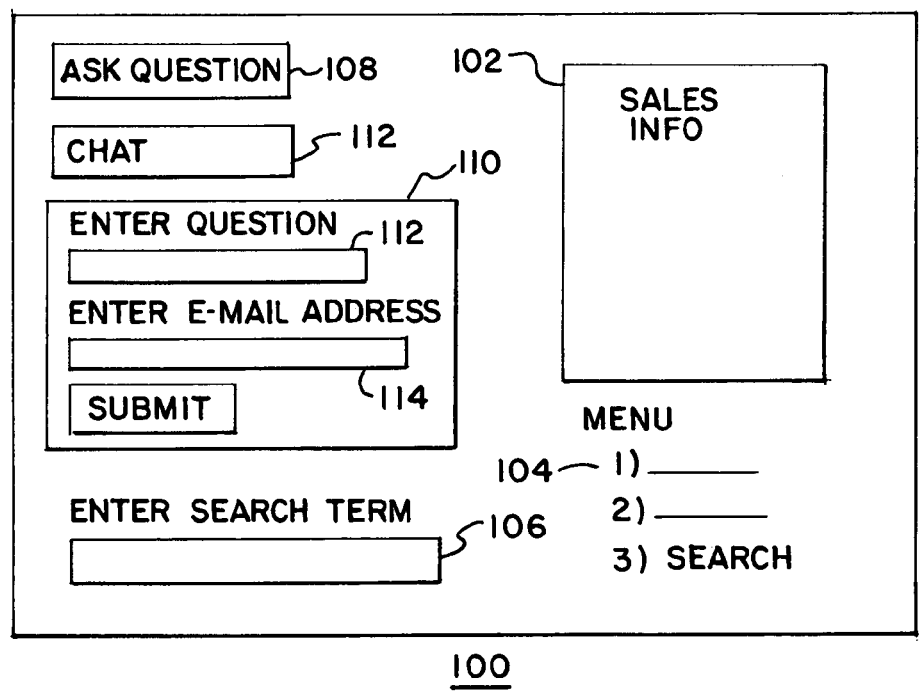
FIG. 2 is a web page that may be provided by the system of FIG. 1.

The website 40, upon receiving and decoding the information request, may download an html document (e.g., webpage 100, FIG. 2) to the customer's terminal 12, 14. Included within the web page 100 may be text and graphical information. For example, the web page 100 may include sales information 102 and a series of menu options 104. Menu options may include hyperlinks to different lines of merchandise and, possibly a search option. If a search option is provided, a text box 106 may be provided for entry of search terms.

The web page 100 may also include an ASK QUESTION softkey 108 for direct contact with an agent via VoIP or CHAT softkey 112 for exchanging text under a instant messaging format. Alternatively, the web page 100 may include an interactive window 110 for entry of a question via e-mail.

In order to provide the functionality of a webpage 100, the website 40 may include one or more processing routines (e.g., Java scripts) associated with predetermined areas of the web page 100. For example, positioning of a cursor over a particular menu option may activate a first Java script that causes the customer's browser to send a URL associated with that menu selection back to the website 40. Alternatively, entry of text into a text box 106 and activation of the SEARCH soft key may activate another Java script that collects the entered text and sends it to a search engine associated with the website 40. Similarly, entry of a query into a question box 112 and of a return e-mail address into a e-mail box 114 may active a Java script that collects the entered query and email address and sends the entered data to the host 24.

Upon receiving and reviewing the web page 100, the customer 16, 18 may review the sales information and may make a menu selection for more information. Upon making a menu selection, the user's browser may forward the menu selection to the website 40. The website 40 may receive and process the menu selection and may download a second web page 100.

In addition to downloading web pages 100, the website 40 may also transfer information to the host 24 regarding website use by the customer 16, 18. The website use may include any web pages 100 visited along with any information entered through text boxes 106 or queries entered through window 110. The host 24 may receive the information and add it to the call object 50, 52 associated with the call.

In addition to visiting a number of web pages 100, the customer 16, 18 may decide that he has a question and may activate the ASK QUESTION soft key 108. Activation of the ASK QUESTION soft key 108 or transmission of an email through window 110 may be regarded by the host 24 as an agent request and used as an indication that a customer 12, 14 has a specific question to ask an agent 28, 30 or that the customer 12, 14 wishes to place an order. In either case, the host 24 may take specific steps (discussed in more detail below) to determine which agent is best suited to service the customer 16, 18.

Any of a number of triggering events may cause the host 24 to route a call to an agent 28, 30. For calls through the PSTN 22, the detection of a call by the switch 26 may trigger the process of delivery of the call to an agent 28, 30. In the event of a call through the Internet 20, activation of the ASK QUESTION softkey 108, or entry of information into the interactive box 110, may trigger the call delivery process.

Upon detection of a triggering event for a call, the host 24 may associate the call object 50, 52 of the call with a call routing application object (RO) 54, 56 based upon the class of the call object 50, 52 and the business rules of the organization. Associating an RO 54, 56 with the call object may mean passing a path identifier of the call object 50, 52 to the RO 54, 56.

In order to select an RO 54, 56, the call object 50, 52 may first be routed to one or more procedural processing applications (PPA) 58 based upon the class of the call object 50, 52. Within the PPA 58, the content of the data fields of the class of the call object 50, 52 may be examined to determine the proper RO 54, 56 for processing the call.

For example, if the call object 50, 52 is classified as being part of a particular outgoing call campaign, then the PPA 58 may select a RO 54, 56 structured for processing calls associated with the particular call campaign involved. Included within the RO 54, 56 may be data and programming instructions associated with processing calls of the call campaign. For example, included within the RO 54, 56 may be a list of agents 28, 30 trained to handle calls of the call campaign. Also included within the RO 54, 56 may be a script to be read by the agent to the call recipient.

The programming instructions within the RO 54, 56 may also allow for retrieval of customer records stored within a database within the host 24. The customer records may be stored as additional call attributes within the call object 50, 52.

Programming instructions contained within the RO 54, 56 may allow for the identification and selection of the qualified agent in a locale closest the call participant. The instructions may allow the RO 54, 56 to query the switch 26 for purposes of identifying an available agent from the list of agents. Agent selection may be based upon any known criteria.

The programming instructions may also provide for activation of an agent object 60, 62 associated with the selected agent 28, 30. The call object 50, 52 may be used as a source of the arguments needed for operation of the view process within the agent object 60, 62.

Upon the association of the call object 50, 52 with the selected RO 54, 56, the RO 54, 56 under control of the programming instructions may retrieve an identifier of the call campaign from the call object 50, 52. The RO 54, 56 may also retrieve customer records and query the switch 26 to determine which of the qualified agents 28, 30 is available.

Upon identifying and selecting a qualified agent 28, 30, the selected RO 54, 56 may retrieve call connection information (e.g., a trunk identifier) from the call object 50, 52. With the call connection information and identity of a qualified agent, the RO 54, 56 may then send a message to the switch 26 requesting connection of the call to the selected agent 28, 30.

Upon selecting an agent, the RO 54, 56 may also associate an agent object 60, 62 of the selected agent 28, 30 with the call (i.e., with the call object 50, 52). A view process of the agent object 60, 62 functions to display information on a terminal 36, 38 of the selected agent 28, 30 based upon data provided by the call object 50, 52.

Since agent objects 60, 62 are associated with specific agents, any particular agent object 60, 62 contains data about the associated agent 28, 30. In addition to being identified with the agent identifier, a agent object 60, 62 may also contain identification information about the terminal 36, 38 of the agent 28, 30 and viewing preferences of the agent 28, 30. The agent object 60, 62 may also contain programming instructions relating to how data is to be retrieved and displayed on the terminal 36, 38 based upon the classification of the call and data content of the call object 50, 52.

As an alternative to storing customer records within the call object 50, 52, the agent object 60, 62 may retrieve a customer identifier from the call object 50, 52 and retrieve the customer records directly from the host 24. Further, by knowing the identify of the routing object 54, 56 assigning the call to the agent object 60, 62, the agent object 54, 56 may also retrieve scripts directly from the host 24.

By having sufficient programming capability included within the agent object 60, 62, the agent object 60, 62 may function independently after call set up. In this case the routing object 54, 56 may be released for use by other call objects 50, 52 once the agent object 60, 62 assumes control of the call.

As an alternative to a call placed to a specific functional group (e.g., a specific sales department) of the organization, a call may be directed to a general number of the organization. As such, the call may be classified by the PPA 58 as having insufficient information for agent selection. To solve this problem, the PPA 58 may transfer the call object 50, 52 (and call) to a voice response unit (VRU) 27. Within the VRU 27, the caller may be orally presented with a number of menu options regarding a call destination. For example, if the organization is a department store, the destinations may be hardware or ladies shoes. Upon receiving the menu options, the caller may activate a touch-tone button on his telephone to select an option.

Upon receiving any menu selection (e.g., ladies shoes), the VRU 27 may add such selections to the call object 50, 52 of the call. The VRU 27 may then transfer the call back to the PPA 58. Based upon the menu selections, the PPA 58 may select an RO 54, 56 for handling ladies shoes. The RO 54, 56 selected may include data and instructions associated with processing calls to a particular call destination. Data may include a list of qualified agents or a skills list. Programming instructions may allow the selected RO 54, 56 to query the switch 26 for a list of available agents and programming steps for selection of one of the available agents. The programming instructions may further allow the selected RO 54, 56 to request connection of the call to the selected agent 28, 30.

In the case of a call arriving through the Internet, detection of activation of the ASK QUESTION softkey 108 may result in transfer of the associated call object 50, 52 to the PPA 58. Based upon the classification of the call object 50, 52 as an Internet call, the PPA 58 may select an RO 54, 56 for Internet calls. Contained within the selected RO 54, 56 may be data related to the types of web pages available through the website 40, as well as agents qualified for handling the subject matter of each web page.

Also included within the selected RO 54, 56 may be programming instructions for selecting an agent based upon the web pages visited by the caller. Programming instructions may also be provided to activate the appropriate Internet communication application (e.g., VoIP, etc.).

Upon selection of the appropriate RO 54, 56 for the Internet call, the RO 54, 56 may retrieve a URL of the caller. With the URL of the caller, the RO 54, 56 may retrieve any available customer records.

The RO 54, 56 may also retrieve a contact history from the call object 50, 52 including any web pages visited. Agent selection may be based on the contact history.

Once an agent 28, 30 is identified, the RO 54, 56 may query the switch 26 to ensure that the identified agent 28, 30 is not already occupied with another call. If not, then the RO 54, 56 may select the agent by associating the call object 50, 52 of the Internet call with the agent object 60, 62 of the identified agent 28, 30. The RO 54, 56 may also send the URL of the caller to the terminal of the selected agent 28, 30 along with instructions to activate a VoIP application.

Upon association of the call object 50, 52 with the agent object 60, 62 of the selected agent 28, 30, the view process may retrieve and present customer records and the contact history of the call to the selected agent 28, 30 on the selected agent's terminal 36, 38. At the same time, activation of the VoIP application may open a voice channel between the selected agent 28, 30 and customer 12, 14. Once the voice channel is opened, the selected agent 28, 30 may converse with the customer 12, 14 and answer questions or take orders as appropriate to the situation.

As an alternative to activation of the ASK QUESTION softkey 108, the customer 12, 14 may activate the CHAT softkey 112 or send an e-mail using the window 110. In either case, the PPA 58 functions to select a routing object 54, 56 appropriate to the situation. In addition to contact history, the PPA 58 may also look for key words in a transmission from the customer 12, 14 for a determination of subject matter.

Once a subject matter is determined, the PPA 58 may select a RO 54, 56 designed to handle the subject matter of the call. Further, selection of the RO 54, 56 may be based upon whether the call is based upon a private chat session or e-mail.

Once difference is selection of an RO 54, 56 may be in the priority given the call. For example, given the immediacy of an expected response, a chat session may be given a higher priority in agent assignment than an email. Moreover, processing of e-mail calls may be deferred by the PPA 58 until periods of low agent activity.

In either case, the selected RO 54, 56 functions to select an agent 28, 30 based upon its own internal data and programming instructions. Once an agent 28, 30 has been selected, the RO 54, 56 may associate an agent object 60, 62 of the selected agent 28, 30 with the call object 50, 52 of the call. The RO 54, 56 may also initiate a short messaging session or present the agent with a window for entry of an e-mail response.

Once an agent object 60, 62 has been assigned to the call, the view process of the agent object 60, 62 may be activated. The view function may provide the agent 28, 30 with a copy of the e-mail, or initial transmission from the customer 12, 14 if a chat session has been initiated. Customer records may also be presented to the agent 28, 30, if the URL of the customer 12, 14 can be correlated within an existing customer base.

Specific embodiments of methods and apparatus for routing calls according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of processing a call with a client by a call center having an agent, such method comprising the step of:
   providing a call object for the call adapted to allow control of the call from any connected computing platform;
   collecting attributes of the call within the call object;
   associating an agent object with the call object; and
   displaying client data to an agent of the call center based upon a view process of the associated agent object.

2. The method of processing the call as in claim 1 wherein the step of collecting the attributes of the call further comprises delivering the call detected by the call center to a call handling application.

3. The method of processing the call as in claim 2 wherein the step of collecting the attributes of the call further comprises receiving call associated information by the call handling application from an associated public switch telephone network.

4. The method of processing the call as in claim 3 wherein the step of collecting the attributes of the call further comprises coupling the call to a voice response unit.

5. The method of processing the call as in claim 4 further comprising coupling the call object to a routing object.

6. The method of processing the call as in claim 5 further comprising transferring the attributes of the call object to the routing object.

7. The method of processing the call as in claim 6 wherein the step of transferring the attributes of the call object to the routing object further comprises retrieving a file of the client from a client database.

8. The method of processing a call as in claim 7 wherein the step of retrieving the file of the client from a client database further comprises storing the client file in the call object.

9. The method of processing the call as in claim 8 further comprising selecting the agent by the routing object based upon the collected attributes of the call object and the retrieved file of the client.

10. The method of processing the call as in claim 1 further comprising connecting a voice channel between the agent and client through a public switch telephone network.

11. The method of processing the call as in claim 1 further comprising connecting exchanging messages between the agent and client through an Internet connection.

12. An apparatus for processing a call with a client by a call center having an agent, such apparatus comprising:
   means for providing a call object for the call adapted to control the call from any connected computing platform;
   means for collecting attributes of the call within the call object;
   means for associating an agent object with the call object; and
   means for displaying client data to an agent of the call center based upon a view process of the associated agent object.

13. The apparatus for processing the call as in claim 12 wherein the means for collecting the attributes of the call further comprises means for delivering the call detected by the call center to a call handling application.

14. The apparatus for processing the call as in claim 13 wherein the means for collecting the attributes of the call further comprises means for receiving call associated information by the call handling application from an associated public switch telephone network.

15. The apparatus for processing the call as in claim 14 wherein the means for collecting the attributes of the call further comprises means for coupling the call to a voice response unit.

16. The apparatus for processing the call as in claim 15 further comprising means for coupling the call object to a routing object.

17. The apparatus for processing the call as in claim 16 further comprising means for transferring the attributes of the call object to the routing object.

18. The apparatus for processing the call as in claim 17 wherein the means for transferring the attributes of the call object to the routing object further comprises means for retrieving a file of the client from a client database.

19. The apparatus for processing a call as in claim 18 wherein the means for retrieving the file of the client from a client database further comprises means for storing the client file in the call object.

20. The apparatus for processing the call as in claim 19 further comprising means for selecting the agent by the routing object based upon the collected attributes of the call object and the retrieved file of the client.

21. The apparatus for processing the call as in claim 12 further comprising means for connecting a voice channel between the agent and client through a public switch telephone network.

22. The apparatus for processing the call as in claim 12 further comprising means for connecting exchanging messages between the agent and client through an Internet connection.

23. An apparatus for processing a call with a client by a call center having an agent, such apparatus comprising:
   a call object adapted to collect attributes of the call and to control the call from any connected computing platform; and
   an agent object associated with the call object and adapted to display client data to an agent of the call center based upon a view process of the associated agent object.

24. The apparatus for processing the call as in claim 23 wherein the call object further comprises a procedural processing application adapted to associate the call object with the agent object.

25. The apparatus for processing the call as in claim 23 wherein the call object further comprises a data field adapted to receive call associated information by the call handling application from an associated public switch telephone network.

26. The apparatus for processing the call as in claim 23 wherein the call object further comprises a voice response unit adapted to collect call attributes.

27. The apparatus for processing the call as in claim 23 further comprising a voice channel coupled between the agent and client through a public switch telephone network.

28. The apparatus for processing the call as in claim 23 further comprising an Internet connection adapted to exchange messages between the agent and client.

* * * * *